July 13, 1948. R. K. ILER 2,445,117
MANUFACTURE OF CHLORINE AND SODIUM SULFATE
Filed Dec. 23, 1939
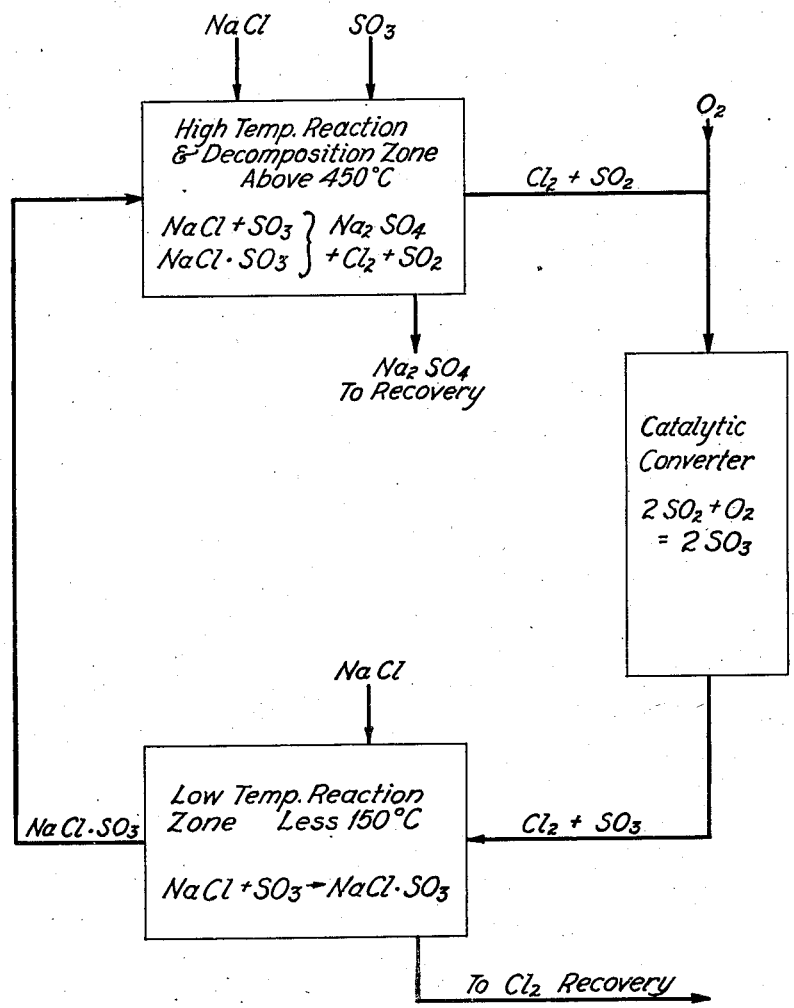
*Ralph K. Iler* INVENTOR.
BY *George T. Johannsen*

Patented July 13, 1948

2,445,117

UNITED STATES PATENT OFFICE 2,445,117

MANUFACTURE OF CHLORINE AND SODIUM SULFATE

Ralph K. Iler, East Cleveland, Ohio, assignor to E. I. du Pont de Nemours & Company, Wilmington, Del., a corporation of Delaware Application December 23, 1939, Serial No. 310,838

1 Claim. (Cl. 23—219)

This invention relates to the manufacture of chlorine and is directed particularly to the recovery of chlorine from mixtures of sulfur dioxide and chlorine as obtained by the action of sulfur trioxide on sodium chloride. More particularly this invention is directed to processes in which sulfur trioxide obtained from a sulfur trioxide-addition complex is caused to act on sodium chloride to liberate equimolecular amounts of sulfur dioxide and chlorine, the sulfur dioxide oxidized to sulfur trioxide, the sulfur trioxide separated by combination with a substance adapted to form therewith a sulfur trioxide-addition complex, and decomposing said addition complex either to liberate sulfur trioxide for reaction with sodium chloride or, in the case of the NaCl complex, to liberate sodium sulfate, chlorine, and sulfur dioxide.

It has long been recognized as desirable to produce chlorine and sodium sulfate by reacting sulfur trioxide with common salt, and divers processes have been suggested for accomplishing this end. Yet, the fact that none of these suggestions have proved of practical value suggests that in some aspects at least the processes were impractical, and I find that one of the reasons lies in the failure of the prior art to provide any practical method of separating the equimolecular mixtures of sulfur dioxide and chlorine which result from the reaction of salt and sulfur trioxide, either directly at appropriate temperatures or through the decomposition of an intermediate product, sodium chlorosulfonate. Thus, it has been proposed to make chlorine and salt cake (sodium sulfate) by passing sulfur trioxide through towers packed with salt, passing the resulting mixture in the presence of air or oxygen in contact with a material adapted to catalyze the reaction sulfur dioxide to sulfur trioxide, passing the resulting mixture again in contact with sodium chloride whereby the sulfur trioxide is caused to react with the salt to form more sodium sulfate, sulfur dioxide, chlorine, and so on, until the sulfur dioxide in the gas is reduced to a nominal figure. Such processes, however, cannot produce a sulfur dioxide-free gas because each step for the removal of sulfur trioxide is accompanied by the formation of sulfur dioxide. It has also been proposed to separate sulfur dioxide and chlorine by liquefaction and fractional distillation, but complete separation is difficult to obtain and the impure sulfur dioxide is of little value by itself.

I have now found that chlorine and sodium sulfate may be produced simply and effectively by causing sulfur trioxide to act on sodium chloride in a manner to produce a gaseous mixture composed essentially of equimolecular quantities of sulfur dioxide and chlorine, adding oxygen to the mixture, catalytically oxidizing the sulfur dioxide to sulfur trioxide, and separating the sulfur trioxide as a sulfur trioxide-addition complex which may be utilized in the production of further quantities of sulfur dioxide and chlorine.

My invention may be more fully understood by reference to the accompanying drawing which illustrates graphically the several steps utilized in carrying out the processes of my invention. As thus illustrated, sulfur trioxide is first caused to act on salt in a manner such that the products are sodium sulfate, sulfur dioxide, and chlorine. This reaction may be carried out in a single step at a temperature above about 450° C., in which case the reaction may be represented as

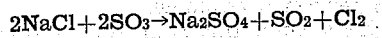

$$2NaCl + 2SO_3 \rightarrow Na_2SO_4 + SO_2 + Cl_2$$

or the reaction may be carried out in two stages in which sodium chlorosulfonate is first formed by reacting sulfur trioxide and salt at a temperature not substantially exceeding 150° C. and preferably below about 100° C., and then decomposed by heating into sodium sulfate, sulfur dioxide and chlorine. The process illustrated in the accompanying flow-sheet utilizes both the high temperature and the low temperature reactions. Thus, as illustrated, salt and sulfur trioxide are reacted in the primary high temperature reaction zone. This same high temperature reaction zone also constitutes the second stage of the low temperature reaction in which the sulfur trioxide is recovered as sodium chlorosulfonate in a low temperature reaction.

Sulfur trioxide suitable for these reactions may be obtained in the usual manner by the oxidation of sulfur in the contact process. The converter gases from such processes are freed of undesirable constituents by absorbing the sulfur trioxide in sulfur trioxide monohydrate to form oleum or fuming sulfuric acid from which the sulfur trioxide may be regenerated in a highly pure form. It is especially desirable to have a highly purified sulfur trioxide if the high temperature process for the direct formation of sodium sulfate, sulfur dioxide, and chlorine is employed, because otherwise the gaseous products of the reaction will be contaminated with the undesirable constituents of the sulfur trioxide. If the low temperature reaction is employed, however, less highly purified sulfur trioxide may be used since in this case the sulfur trioxide is wholly absorbed as sodium chlorosulfonate and the impurities are thereby separated.

The sulfur dioxide-chlorine mixture thus obtained is diluted with oxygen in the amount required to give the desired $SO_2:O_2$ ratio for efficient conversion of the sulfur dioxide to sulfur trioxide and so much diluent gas, preferably chlorine recycled from a subsequent step in the process, to give an $SO_2$ concentration commensurate with the capability of the converter system to dissipate the heat of the reaction. This gas mixture is then exposed to a catalyst or oxidation promoter under conditions, as represented in the flow sheet, adapted to promote the oxidation of sulfur dioxide to sulfur trioxide.

The amount of oxygen introduced should be kept to a minimum since any unreacted oxygen passing through the converter will have to be separated in a subsequent step. Preferably, oxygen is added in an amount sufficient that the molal ratio of sulfur dioxide to oxygen is not substantially less than one and not substantially greater than two. It may be desirable, however, in some cases to operate with a deficiency of oxygen, especially since small amounts of sulfur dioxide may be more readily separated from chlorine than small amounts of oxygen.

The gas mixture emanating from the converter will consist predominantly of sulfur trioxide and chlorine together with minor amounts of oxygen and/or sulfur dioxide. The composition of this mixture will depend not only upon the sulfur dioxide to oxygen ratio and the efficiency of the converter but also upon the amount of diluent gas (recycled chlorine) introduced. In general, the components of the converter gas other than sulfur trioxide and chlorine will not exceed more than about 25 per cent by volume, and preferably these components are desirably held to less than about 5 per cent by volume.

The gases emanating from the converter after being suitably cooled are contacted with a substance adapted to form an addition complex with sulfur trioxide. By sulfur trioxide-addition complexes I mean substances which are formed by simple addition reactions between sulfur trioxide and some other compound. Compounds which so react with sulfur trioxide are well known to those skilled in the art, and as examples I may cite sulfur trioxide monohydrate, sodium sulfate, and sodium chloride.

The gases leaving the converter, for example, may be cooled to below 150° C. and preferably to about 50 to 100° C. and passed in contact with sodium chloride, preferably in the presence of a small quantity of hydrogen chloride as a catalyst, and the sulfur trioxide will be absorbed as the sulfur trioxide-addition complex sodium chlorosulfonate. The chlorine passes on unchanged and may be freed of small amounts of sulfur dioxide or sulfur oxychloride, oxygen, and any other impurities present in any suitable manner. The sulfur compounds present may be removed, for example, by scrubbing with water or dilute acids, or by fractional distillation. Oxygen too may be separated by fractional distillation, by preferential adsorption, or in any other suitable manner.

The sodium chlorosulfonate so formed may be recycled to the salt and sulfur trioxide reaction and there decomposed to form additional quantities of sodium sulfate, chlorine, and sulfur dioxide. The use of salt as an absorbent may advantageously be employed in such processes as employ two steps in the salt sulfur trioxide reaction, since in such case sodium chlorosulfonate is a product of the first step of the reaction and also a product of the final step of the process. The two separate lots of sodium chlorosulfonate can be combined in a single step of decomposition to sodium sulfate, chlorine, and sulfur dioxide.

Instead of using sodium chloride as the absorbent to separate sulfur trioxide from the converter gases I have found it of advantage to employ adsorbents in which the sulfur trioxide is loosely bound and can be regenerated. I may, for example, pass the converter gases after being suitably cooled, say to about 20 to 100° C., in contact with sulfuric acid to form oleum or fuming sulfuric acid. The absorbent in such case is the sulfur trioxide monohydrate and may be regenerated on the application of heat sufficient to drive off the absorbed sulfur trioxide and recycled for separating further quantities of sulfur trioxide from the converter gases. The regenerated sulfur trioxide may be recycled to the sodium chloride sulfur trioxide reaction, but for the most part it will be found more desirable to combine the oleum thus produced with oleum from an extraneous source, as for example a contact sulfuric acid plant, and to strip the sulfur trioxide therefrom in a single oleum still. In place of sulfuric acid other absorbents such as sodium sulfate, which forms sodium pyrosulfate, may be used.

In view of the highly reactive nature of mixtures of sulfur dioxide and chlorine, and particularly in view of the tendency of such mixtures to react with water to form sulfuric acid and hydrochloric acid, it is desirable that a high degree of efficiency in the conversion of the sulfur dioxide to sulfur trioxide be obtained if the absorbent contains any substantial quantity of water. I have found that this difficulty may be avoided by using a vanadium catalyst, since with this catalyst a sufficiently high percentage conversion can be obtained that very little chlorine will be lost to the process even if water is present in the absorbent. I have also found that loss of chlorine may be avoided in this manner by effecting the absorption of sulfur trioxide from the converter gases in sulfur trioxide monohydrate. It appears that in an adsorbent in which the sulfur trioxide is in an amount at least molecularly equivalent to the water the tendency of sulfur dioxide and chlorine to react with the water to form hydrochloric acid and sulfuric acid is avoided.

I claim:

In the manufacture of chlorine and sodium sulfate by the interaction of sodium chloride and sulfur trioxide the steps of bringing sodium chloride in contact with essentially pure sulfur trioxide at a temperature above the decomposition temperature of sodium pyrosulfate for a time sufficient to convert substantially all of the sodium chloride to sodium sulfate, separating the gaseous products of the reaction from the solid products, treating the gaseous products to oxidize the sulfur dioxide to sulfur trioxide, contacting the sulfur trioxide-containing gas thus obtained with sodium chloride at a temperature below 150° C. but sufficiently high to produce sodium chlorosulfonate for a time sufficient to convert substantially all of the sulfur trioxide to sodium chlorosulfonate, separating the gaseous products of the last named reaction from the solid products thereof and introducing the solid product of the second named reaction into the first named reaction wherein the heat of the reaction decomposes the sodium chlorosulfonate.

RALPH K. ILER.

REFERENCES CITED

The following references are of record in the file of this patent:

UNITED STATES PATENTS

| Number | Name | Date |
|---|---|---|
| 123,875 | Deacon | Feb. 20, 1872 |
| 1,498,168 | Hill | June 17, 1924 |

FOREIGN PATENTS

| Number | Country | Date |
|---|---|---|
| 1,908 | Great Britain | 1871 |
| 2,329 | Great Britain | 1871 |
| 249,474 | Great Britain | Oct. 28, 1926 |

OTHER REFERENCES

Schultz-Sellack, Berichte der Deutsche Chemische Gesellschaft 4, (1871), pp. 112 and 113.